US012715259B2

(12) United States Patent
Claussen et al.

(10) Patent No.: US 12,715,259 B2
(45) Date of Patent: Aug. 25, 2026

(54) TWIST BEAM AXLE

(71) Applicant: BENTELER AUTOMOBILTECHNIK GMBH, Paderborn (DE)

(72) Inventors: Lars Claussen, Bad Lippspringe (DE); Olaf Hertel, Braunschweig (DE); Andreas Rieckmann, Braunschweig (DE); Eduard Schmidt-Beljawski, Uelzen (DE); Klaus Schneider, Marsberg (DE); Erik Schultz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 159 days.

(21) Appl. No.: 18/912,596

(22) Filed: Oct. 11, 2024

(65) Prior Publication Data

US 2025/0121644 A1 Apr. 17, 2025

(30) Foreign Application Priority Data

Oct. 12, 2023 (DE) ........................ 102023127934.3

(51) Int. Cl.
*B60G 21/05* (2006.01)

(52) U.S. Cl.
CPC ........ *B60G 21/051* (2013.01); *B60G 2200/21* (2013.01); *B60G 2202/136* (2013.01); *B60G 2206/203* (2013.01)

(58) Field of Classification Search
CPC .......... B60G 2202/136; B60G 2200/21; B60G 21/051
See application file for complete search history.

(56) References Cited

U.S. PATENT DOCUMENTS 6,099,084 A * 8/2000 Bungarten ........... B60G 21/051 280/124.166
10,315,484 B2 * 6/2019 Chelikani ............... B23P 15/00
(Continued)

FOREIGN PATENT DOCUMENTS

CN 104999878 A 10/2015
CN 107985001 A * 5/2018 ........... B60G 21/051
(Continued)

OTHER PUBLICATIONS

Office Action, German Application No. 10 2023 127 934.3, mailed Jun. 6, 2024, 8pp.
(Continued)

*Primary Examiner* — S. Joseph Morano
*Assistant Examiner* — Maxwell L Meshaka
(74) *Attorney, Agent, or Firm* — HAUPTMAN HAM, LLP

(57) ABSTRACT

A twist beam axle has two side arms and a twist profile. The twist profile is joined to a side arm by a weld. At least in the area of the welded joint, the twist profile has a wall with a wall thickness that is greater than the wall thickness of a wall of one side arm. The twist profile has a joining surface at each end section and the side arms each have a joining surface, wherein the twist profile and the side arms are each joined at mutually facing joining surfaces by a weld. The joining surface on the end section of the twist profile has a bevel manufactured without cutting. The joining gap formed between the mutually facing joining surfaces of the end section and the side arm is configured in a V-shape.

14 Claims, 5 Drawing Sheets

(56) References Cited

U.S. PATENT DOCUMENTS

| | | | | |
|---|---|---|---|---|
| 11,104,200 | B2 * | 8/2021 | Beilfuss | B60G 21/051 |
| 11,305,605 | B2 * | 4/2022 | Song | B60G 21/051 |
| 11,524,324 | B2 * | 12/2022 | Schultz | B21D 53/88 |
| 2014/0174610 | A1 * | 6/2014 | Edahiro | C21D 9/08<br>148/400 |
| 2018/0229575 | A1 * | 8/2018 | Chelikani | B60G 21/051 |
| 2019/0217359 | A1 * | 7/2019 | Schultz | B21D 53/88 |
| 2020/0062072 | A1 * | 2/2020 | Beilfuss | B60G 21/051 |
| 2021/0300142 | A1 * | 9/2021 | Song | B60G 21/051 |

FOREIGN PATENT DOCUMENTS

| | | | | | |
|---|---|---|---|---|---|
| CN | 109532381 | A | * | 3/2019 | |
| DE | 2735939 | C2 | | 10/1979 | |
| DE | 19933108 | A1 | | 2/2001 | |
| DE | 102009037905 | A1 | | 2/2011 | |
| DE | 102009050058 | B4 | | 8/2016 | |
| EP | 0916530 | B1 | | 12/2002 | |
| EP | 2221196 | A1 | * | 8/2010 | B60G 21/051 |
| FR | 3144102 | A1 | * | 6/2024 | |
| KR | 10-2010-0006284 | A | | 1/2010 | |
| KR | 20140002995 | A | * | 1/2014 | |

OTHER PUBLICATIONS

Extended European Search report in EP Application No. 24204231.5, dated Mar. 20, 2025, 20pp.

Office Action in EP Application No. 24204231.5, dated Apr. 16, 2026, 14pp.

* cited by examiner

TWIST BEAM AXLE

RELATED APPLICATIONS

The present application claims priority of German Application Number 10 2023 127 934.3 filed Oct. 12, 2023, the disclosure of which is hereby incorporated by reference herein in its entirety.

FIELD

The present disclosure relates to a twist beam axle for motor vehicles.

BACKGROUND

A twist beam axle has two rigid and torsionally stiff side arms and a twist profile extending transversely therebetween, which connects the side arms in a torsionally soft manner. A twist beam axle is characterized by good lateral guidance when cornering as well as its economical space requirement and low weight.

A twist beam axle with a V-shaped cross-section twist profile is described in DE 27 359 39 C2 or EP 0 916 530 B1. The twist profile is welded to the side arms.

Due to the high dynamic and static forces acting during operation, for example, longitudinal forces, the weld between the twist profile and the side arms is subject to high loads. The strength of the welds and the weld quality are therefore important. The penetration depth of a weld is closely related to the joint strength.

SUMMARY

The object of the present disclosure is to improve the load behavior and increase the service life of a twist beam axle without increasing its weight to a disadvantage.

A twist beam axle has two side arms and a twist profile that connects the two side arms in a torsionally soft manner. The twist profile is joined to the side arms by a welded joint. The twist profile has a wall with a wall thickness and the side arms each have a wall with a wall thickness. The twist profile has a joining surface at each end section. Each side arm also has a joining surface. The twist profile and the side arms are each joined by a weld at mutually facing joining surfaces. The twist profile and one side arm each are joined together at an angle of 90°. The abutment surface at the end section of the twist profile is welded to the surface of one side arm to take the shape of a "T". This creates a T-joint between the twist profile and each side arm.

The joining surface at the end sections of the twist profile has a bevel manufactured without cutting. The bevel causes the end section to taper towards the front end of the twist profile. The end sections of the twist profile receive a seam preparation that is tailored to the welding joint. The joining surface is extended by the section of the bevel and tapers towards the end of the end section. The bevel in the joining surface of the end section gives the joining gap between the joining surface at the end section of the twist profile and the joining surface on one side arm a V-shaped configuration. The joining gap between the end section of the twist profile and the side arm has a V-shaped configuration. The bevel and the V-shaped joining gap enable a high penetration in the twist profile. The term penetration refers to the depth of the molten zone in the base material, here the steel material of the twist profile in the end section. A component-optimized and procedurally improved penetration is created in the twist profile.

The penetration is usually between 2% and 10%. The present disclosure includes higher degrees of penetration. The flank penetration length, i.e. the length of the molten area in which the welding filler material has bonded to the base material, is 70% to 90% of the wall thickness of the components, for example, the wall thickness of the twist profile. In at least one embodiment of the present disclosure, a penetration of up to 30% in a process-reliable manner is able to be achieved. Practical tests suggest that even higher penetration values are able to be expected, so that penetration is able to be increased to more than 50%.

The bevel provided by the present disclosure allows welding filler material to be pushed between the components in the joining gap during welding, so that the root of the weld is displaced further or deeper into the joining gap. The result is a significantly higher penetration.

In at least one embodiment of the present disclosure, a twist beam axle with a longer service life without increasing the weight of the component is able to be formed. The welded joint between the twist profile and the two side arms is highly stable and exhibits an optimized static and, for example, a dynamic load behavior. The advantageous driving dynamics properties and thus the performance with maximum driving stability and comfort are retained.

The twist profile and the side arms often have different wall thicknesses. The twist profile is able to have a greater wall thickness than the side arms. In a welded joint using a butt joint, the difference in wall thickness between the twist profile and the side arm makes obtaining a high penetration of the weld into the twist profile without causing a burn-through at the side arm difficult to achieve. The reduced penetration is able to lead to a reduction in the service life of a twist beam axle. This is where the present disclosure provides a solution.

In at least one embodiment of the present disclosure, the twist profile has a greater wall thickness than the side arms. The wall thickness of the twist profile wall is greater, at least in the area of the welded joint, than the wall thickness of the wall of one side arm in the area of the welded joint.

In at least one embodiment of the present disclosure, the wall thickness of the twist profile wall is able to be smaller than the wall thickness of the wall of one side arm. The wall thickness of the twist profile wall is able to be smaller overall than the wall thickness of the wall of one side arm. However, the wall thicknesses is also able to differ from each other only in the area of the welded joint between the twist profile and the side arm.

The bevels according to the present disclosure and the V-shaped joining gap achieve a high penetration in the first component, i.e., the component with the thicker or stronger wall, without any burn-through occurring in the thinner wall of one side arm.

The bevel is able to extend along the entire joining surface of the twist profile. In at least one embodiment of the present disclosure, the bevel is provided in the areas of an abutting edge in which the greatest loads occur due to external forces. In the case of a twist profile of a twist beam axle, the bevel is provided on the joining surfaces of the legs of the twist profile. In the case of a twist profile with a U- or V-shaped cross-section, the bevel is arranged on the inside or outside of the cross-section on the outside of the twist profile of the cross-section on the inside of the twist profile along the legs.

The bevel is also able to be provided only on a partial section of the length of the joining surface at the end section of the twist profile. In at least one embodiment of the present disclosure, the bevel is formed extending from a free end of the twist profile wall over a longitudinal section of approx. 30% to 75%, or approx. 50%, of the length of the twist profile wall. The tangential length of the bevel is measured in the cross-section of the twist profile in the direction of the circumference of the twist profile and is able to extend over the entire circumferential length of the front side of the twist profile. However, alternatively, the tangential length of the bevel is only able to run over the length of a leg or be provided on a partial section of the length of a leg of a twist profile.

The design of the joining surface at the end section of the twist profile with the bevel manufactured without machining according to the present disclosure results in a V-shaped configuration. The bevel manufactured without machining and the V-shaped joining gap enable an optimized high penetration. The quality of the welded joint is improved.

The twist profile and the side arms are aligned at an angle transverse to each other; for example, the twist profile abuts each side arm with a T-joint.

The end section of the twist profile has an abutment surface on the front side, with the abutment surface running perpendicular to the longitudinal axis of the twist profile wall. The front side abutment surface is part of the joining surface at the end section of the twist profile. The twist profile obtusely abuts the joining surface on the side arm with its abutment surface.

The bevel is part of the joining surface at the end section of the twist profile. The bevel runs into the front side of the end section. The abutment surface adjoins the bevel.

The abutment surface is longer than the length of the bevel. The abutment surface extends parallel to the joining surface on one side arm.

Each side arm has a tubular cross-section at least in a mid-longitudinal section and is designed as a hollow profile or formed by a hollow profile. In the joining area with the twist profile, each trailing arm has a joining surface matched to the end abutment surface of the twist profile. The joining surfaces of the twist profile and side arm are designed to be congruent to each other.

The present disclosure provides that the abutment surface has a width measured perpendicular to the longitudinal axis of the twist profile wall, which is greater than the wall thickness of the wall of one side arm.

The bevel runs at an angle to the longitudinal axis of the twist profile wall, for example, the angle is in a range between 25° and 60°. An angle in the range of 30° to 45° or an angle of approximately 45° is also achievable.

The bevel has an axial length, the axial length being equal to or smaller than the wall thickness of the twist profile wall in the end section. In at least one embodiment of the present disclosure, the ratio of the axial length of the bevel to the wall thickness of the twist profile wall is between 1:1 and 1:1.5. The axial length of the bevel is measured in the direction of the longitudinal axis of the twist profile wall.

The abutment surface on the front side of the end section of an end profile has a width, the width being measured perpendicular to the longitudinal axis of the twist profile wall. The width of the abutment surface is greater than the wall thickness of the twist profile wall. In at least one embodiment of the present disclosure, the width of the abutment surface is 10% to 50% greater than the wall thickness of the twist profile wall. Accordingly, the ratio of the wall thickness of the twist profile wall to the width of the abutment surface is between 1:1.1 and 1:1.5.

According to the present disclosure, the bevel in the joining surface at the end section of the twist profile is manufactured without machining. Here, a controlled plastic deformation is performed at the end section of the twist profile. The end section is brought into the desired shape by applying an external force. This is able to be done by bending or shear forming.

Two side arms and a twist profile are provided for the production of the twist beam axle. The components of the twist beam axle are made of steel. The twist profile and the side arms have different wall thicknesses, at least in the area of the welded joint. This means the wall thickness of the twist profile is stronger than the wall thickness of one side arm. The twist profile and the side arms are arranged at an angle to each other and joined by a weld.

To manufacture the twist profile, a initial blank is provided which has a wall with a wall thickness. The end section of the initial blank is formed and a bevel is created at the end section, after which the end section is trimmed at the end and an abutment surface is created at the front of the end section.

The initial blank is formed into a twist profile. In at least one embodiment of the present disclosure, the initial blank is formed around its longitudinal axis and provided with the cross-section of the twist profile, for example with a U- or V-shaped cross-section.

Furthermore, the two side arms are provided. The side arms have a wall with a wall thickness that is different from the wall thickness of the twist profile wall.

The twist profile and the side arms are aligned at an angle relative to each other so that the joining surface of the twist profile and the joining surfaces of the side arms face each other. The twist profile and side arms are then joined together using a weld on the joining surfaces.

In at least one embodiment of the present disclosure, the end section of the twist profile or of the initial blank forming the twist profile is laterally displaced, bent or embossed.

To manufacture the bevel at the end section, the end section of the initial blank is able to first be formed into an S-shape. The end section is then trimmed and an end section is cut off from the free end of the end section. The trimming is carried out perpendicular to the longitudinal axis of the initial blank or the wall of the initial blank. During the trimming process, a slight bevel is created, on the side of the counter-holder of the cutting tool. The trimming line therefore does not run in a straight line, but has a slightly slanted bevel or surface at the end of the trimming line.

The initial blank is able to be subjected to further forming before or after forming and trimming the end section. During this forming step, the initial blank is given a cross-sectional configuration of the twist profile, at least in some areas, for example, over its length.

BRIEF DESCRIPTION OF THE DRAWINGS

The present disclosure is described in more detail hereinafter with reference to the drawings. In the drawings.

DETAILED DESCRIPTION

FIG. 1A to FIG. 1D show the forming process for manufacturing a twist profile 1 of a twist beam axle 2. FIG. 2B shows a section of the twist beam axle 2.

Figure 1A:
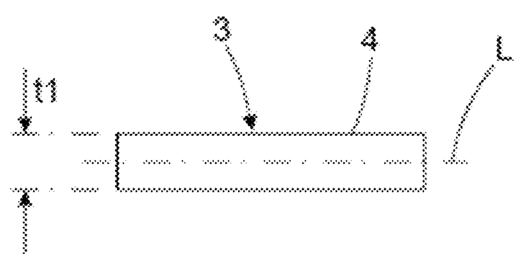
FIG. 1A to FIG. 1D show a technical diagram of the procedure for manufacturing a twist profile with a joining surface which has a bevel and an abutment surface in accordance with at least one embodiment.
Figure 1B:
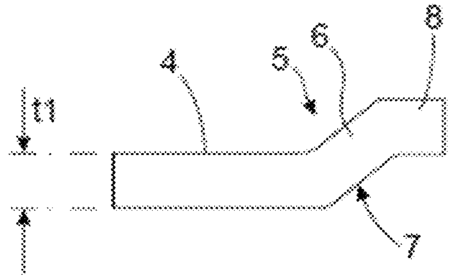

FIG. 1A shows an initial blank 3. The initial blank 3 has a wall 4 with a wall thickness t1.

An end section 5 of the initial blank 3 is formed without machining. The end section 5 is plastically deformed and configured in an S-shape. In this way, a leg 6 with a bevel 7 and an end section 8 running parallel to the longitudinal axis L of the wall 4 of the initial blank 3 are formed at the end section 5. This is shown in the illustration in FIG. 1B. The end section 8 is laterally displaced parallel to the longitudinal axis L of the wall 4.

Figure 1C:
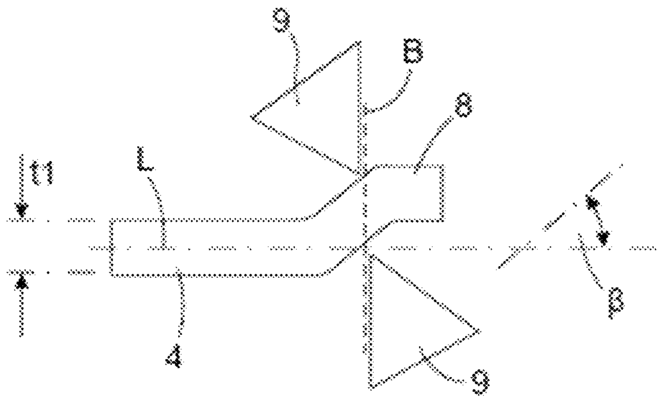

FIG. 1C illustrates the trimming operation at the end section 5. An end-side trim is performed at the end section 5. The cutting tool is marked with the reference symbol 9. The trimming is carried out at an angle perpendicular to the longitudinal axis L of the wall 3 of the initial blank 13 along the trimming line B.

The trimming operation is carried out in the area of the leg 6 with the bevel 7. The end section 8 is removed during trimming. A abutment surface 10 perpendicular to the longitudinal axis L is formed at the front of the end section 5.

Figure 1D:
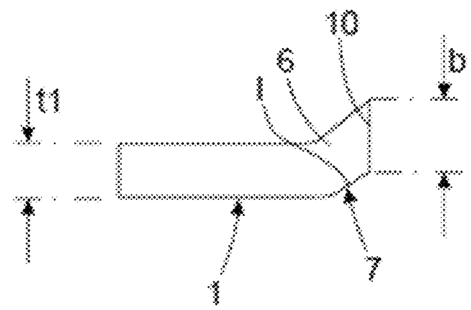

FIG. 1D shows the trimmed twist profile 1. To form the twist profile 1, the initial blank 3 has been formed, for example around the longitudinal axis L, in order to manufacture a U- or V-shaped cross-sectional profile.

The abutment surface 10 has a width b measured perpendicular to the longitudinal axis L of the wall 4 of the twist profile 1, which is greater than the wall thickness t1 of the wall 4 of the twist profile 1. The ratio of the wall thickness t1 of the wall 4 of the twist profile 1 to the width b of the abutment surface 10 is between 1:1.1 and 1:1.5.

The bevel 7 has an axial length l. The axial length l of the bevel 7 is measured in the direction of the longitudinal axis L of the wall 4 of the twist profile 1. This axial length l is measured in the area of the subsequent joint. The bevel 7 runs at an angle β of 25° to 60°, or 30° to 45°, to the longitudinal axis L of the wall 4 of the twist profile 1. The ratio of the axial length l of the bevel 7 to the wall thickness t1 of the wall 4 of the twist profile 1 is 9 Substitute Specification-Clean between 1:1 and 1:5. The bevel 7 is located on the side of the end section 5 of the twist profile 1, which forms an acute angle β with the side arm 11.

A side arm 11 made of steel is provided for manufacturing the twist beam axle 2. The side arm 11 has a wall 12 with a wall thickness t2. The wall thickness t1 of the wall 4 of the twist profile 1 is greater than the wall thickness t2 of the wall 12 of the side arm 11.

The twist profile 1 has a joining surface 13 at the end section 5. The joining surface 13 includes the bevel 7 and the front-side abutment surface 10.

The side arm 11 has a joining surface 14.

Figure 2A:
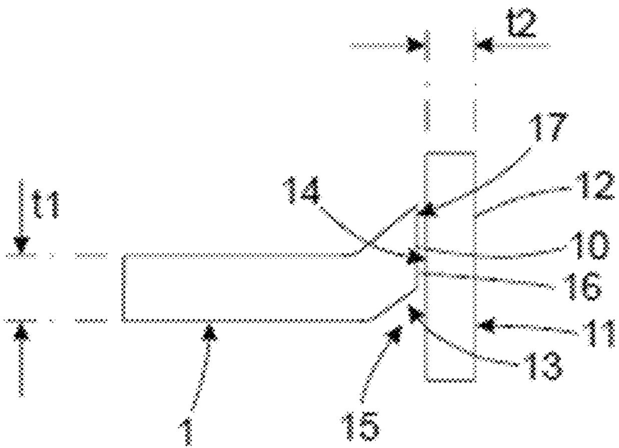
FIG. 2A shows a section of the twist profile wall and a section of the wall of one side arm before welding in accordance with at least one embodiment.
Figure 2B:
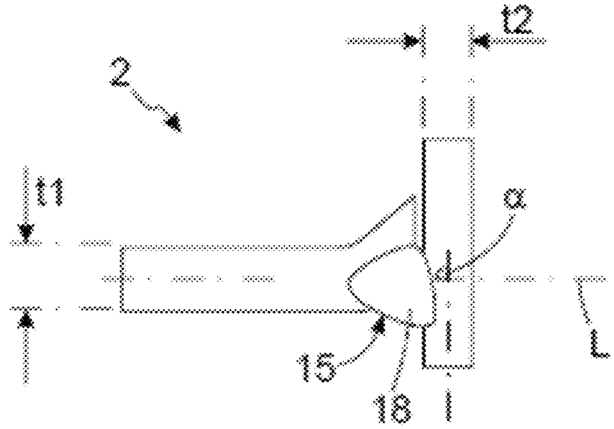
FIG. 2B shows the components according to the representation in FIG. 1A after welding in accordance with at least one embodiment.

The twist profile 1 and the side arm 11 are joined together by a welded joint. To create the welded joint, the twist profile 1 and the side arm 11 are positioned relative to each other. This is shown in FIG. 2A. The twist profile 1 and the side arm 11 are arranged at an angle α to each other, for example, the twist profile 1 abuts the side arm 11 obtusely at a right angle α with a T-joint.

The joining surface 13 of the twist profile 1 and the joining surface 14 of the side arm 11 face each other. The abutment surface 10 runs perpendicular to the longitudinal axis L of the wall 4 of the twist profile 1. The abutment surface 10 is oriented parallel to the joining surface 14 of the side arm 11. A V-shaped joining gap 15 is formed between the joining surface 13 of the twist profile 1 and the joining surface 14 of the side arm 11. At the deepest point of the V-shaped joining gap 15, a gap section 16 is formed parallel between the abutment surface 10 and the abutment surface 14 of the side arm 11. The bevel 7 runs at an acute angle towards the front side 17. The bevel 7 ends at the front side 17. The abutment surface 10 adjoins the bevel 7 at an obtuse angle.

The material-locking joint is made via a weld 18, as shown in FIG. 2B. The bevel 7 and the V-shaped joining gap 15 make the weld 18 efficient, whereby a high penetration in the twist profile 1 is achieved.

The seam preparation and the formation of the bevel 7 in the joining surface 13 on the twist profile 1 as well as the V-shaped configuration of the joining gap 15 create a welded joint between the twist profile 1 and the side arm 2 with a quality and service life that meets the requirements. The penetration of the weld 18 on the twist profile 1 is able to be increased without causing burn-through on the side arm 11. The weld 18 meets the highest strength requirements, whereby the overall service life of the twist beam axle 2 is able to be increased without increasing its overall weight.

Figure 3:
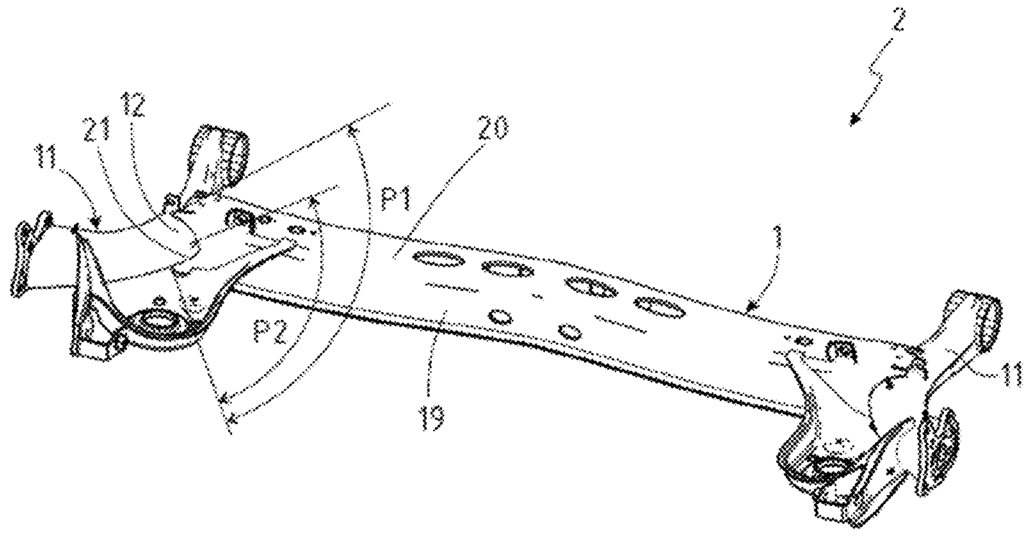
FIG. 3 shows a twist beam axle in a perspective view in accordance with at least one embodiment.

FIG. 3 shows a twist beam axle 2 with a twist profile 1 and two side arms 11. The twist profile 1 connects the two side arms 11 and is welded to them. The twist profile 1 has a wall 4 with a wall thickness t1. Each side arm 11 has a wall 12 with a wall thickness t2. The wall thickness t1 of the wall 4 of the twist profile 1 is able to be greater than the wall thickness t2 of one side arm. Reference is made to the descriptions of the illustrations in FIG. 1 and FIG. 2. The twist profile 1 has a U-shaped cross-section with two side legs 19 which are joined via an apex section 20. The end section 5 of the twist profile abuts the wall 12 of one side arm. The joining surface 13 at the end section 5 of the twist profile 1 is adapted to the outer contour of the wall 12 of the side arm 11.

The arrow P1 in FIG. 3 schematically indicates the length of one side leg 19 with which the end section 5 of the twist profile abuts the outer circumference of one side arm 11. This is approximately 180°+/−15° in relation to the circumference of the side arm, which has a round cross-section.

The arrow P2 indicates the length of a longitudinal section 21 of the side leg 19, in which the bevel 7 is provided on the inside of the side leg 19. The bevel 7 is provided in the lower longitudinal section 21 of the side leg 19. In at least one embodiment of the present disclosure, the bevel 7 extends over two thirds, or approximately half of the length of one side leg 19. In relation to the cross section of one side arm 11, the bevel 7 extends over a circumferential section of approximately 90°+/−15°. The bevel 7 is provided in the lower longitudinal section 21 of one side leg 19 extending from the free end of the leg.

Figure 4:
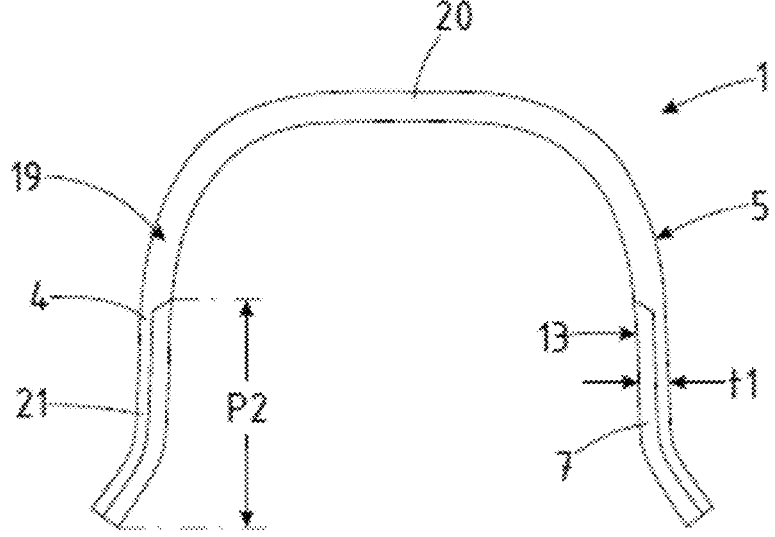
FIG. 4 shows a view of the front side of the end section of a twist profile of a twist beam axle in accordance with at least one embodiment.

FIG. 4 shows a front view of the joining surface 13 at an end section 5 of a twist profile 1. The twist profile 1 has a wall 4 with a wall thickness t1. A bevel 7 manufactured according to the present disclosure is provided in the joining surface 13 at the end section 5 of the twist profile 1. The bevel 7 runs on the inside of the side legs 19 of the twist profile 1.

The bevel 7 is provided in the lower longitudinal section 21 of the side leg 19 extending from the free end of the leg. The tangential length of the longitudinal section 21 is indicated by the arrow P2. In the shown embodiment example, the bevel 7 extends approximately over half the length of one side leg 19.

Figure 5:
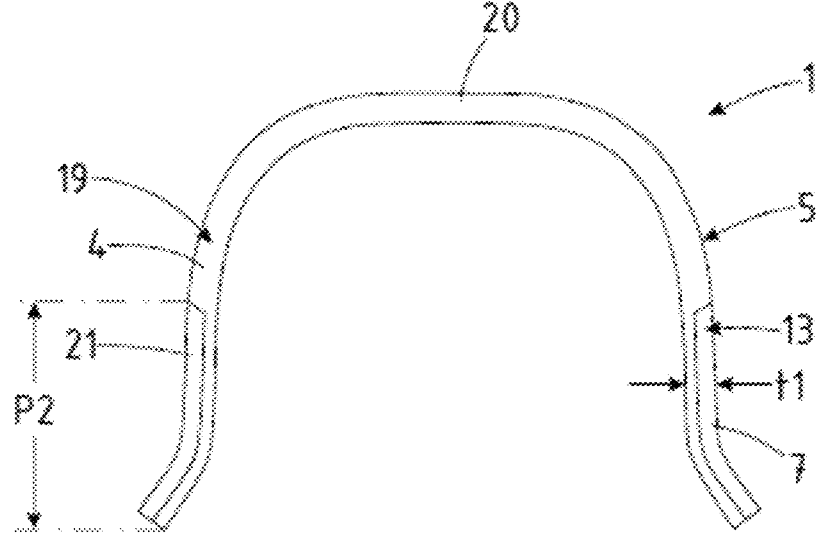
FIG. 5 shows a view of the front side of the end section of a further embodiment of a twist profile in accordance with at least one embodiment.

FIG. 5 shows a front view of the joining surface 13 in an alternative embodiment at the end section 5 of a twist profile 1. Here, unlike the embodiment according to FIG. 4, the bevel 7 is arranged on the outside of the side legs 19 of the twist profile. As in the other embodiments, the bevel 7 is manufactured by machining. The bevel 9 extends in a lower longitudinal section 21 of each side leg 13 extending from the free end of the leg. Otherwise, the embodiment corresponds to that of FIG. 4 and the associated description.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A twist beam axle, comprising:

two side arms connected to each other by a twist profile, wherein the twist profile has a wall with a wall thickness and the two side arms each have a wall with a wall thickness, wherein the twist profile has a joining surface at each end section thereof, and the two side arms each have a joining surface, wherein the twist profile and the two side arms are each joined by a weld at the joining surfaces, and the joining surfaces at the end sections of the twist profile each have a bevel, and the end sections of the twist profile each have an abutment surface on a front side thereof, wherein the abutment surface has a width measured perpendicular to a longitudinal axis of the wall of one side arm of the two side arms, and the width is greater than the wall thickness of the wall of the one side arm, and wherein the twist profile obtusely abuts the joining surface of each of the side arms via the abutment surface at a corresponding one of the end sections of the twist profile.

2. The twist beam axle of claim 1, wherein the wall thickness of the wall of the twist profile is greater than the wall thickness of the wall of the one side arm.

3. The twist beam axle of claim 1, wherein the wall thickness of the wall of the twist profile is smaller than the wall thickness of the wall of the one side arm.

4. The twist beam axle of claim 1, wherein the abutment surface extends perpendicular to a longitudinal axis of the wall of the twist profile.

5. The twist beam axle of claim 4, wherein the abutment surface adjoins the bevel.

6. The twist beam axle of claim 1, wherein the bevel runs at an angle of 25° to 60° or 30° to 45°, to a longitudinal axis of the wall of the twist profile.

7. The twist beam axle of claim 1, wherein the bevel has an axial length and a ratio of the axial length of the bevel to the wall thickness of the wall of the twist profile is between 1:1 and 1:1.5.

8. The twist beam axle of claim 7, wherein the ratio of the wall thickness of the wall of the twist profile to the width of the abutment surface is between 1:1.1 and 1:1.5.

9. A twist beam axle of claim 1, wherein the bevel is in a longitudinal section extending from a free end of the wall.

10. The twist beam axle of claim 1, wherein the abutment surface adjoins the bevel at an obtuse angle.

11. The twist beam axle of claim 1, wherein the abutment surface is longer than an axial length of the bevel.

12. The twist beam axle of claim 1, wherein the abutment surface extends parallel to the joining surface of the side arm.

13. The twist beam axle of claim 1, wherein the width of the abutment surface is 10% to 50% greater than the wall thickness of the wall of the twist profile.

14. The twist beam axle of claim 1, wherein the abutment surface has a gap section parallel to the joining surface of the side arm to facilitate weld penetration.

* * * * *